D. N. BLACKWELL.
COTTON CHOPPER.
APPLICATION FILED SEPT. 30, 1907.
906,768.
Patented Dec. 15, 1908.
Fig. 1.
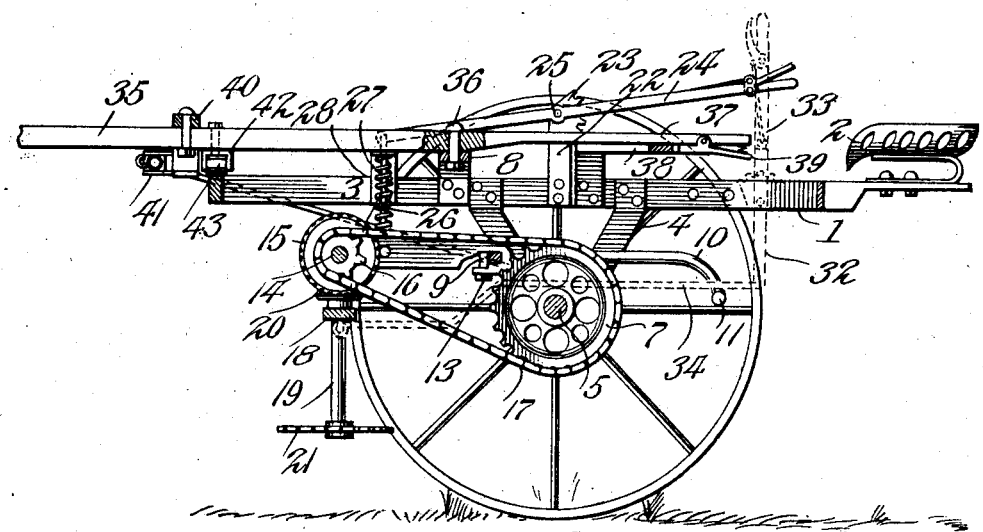
Fig. 2.
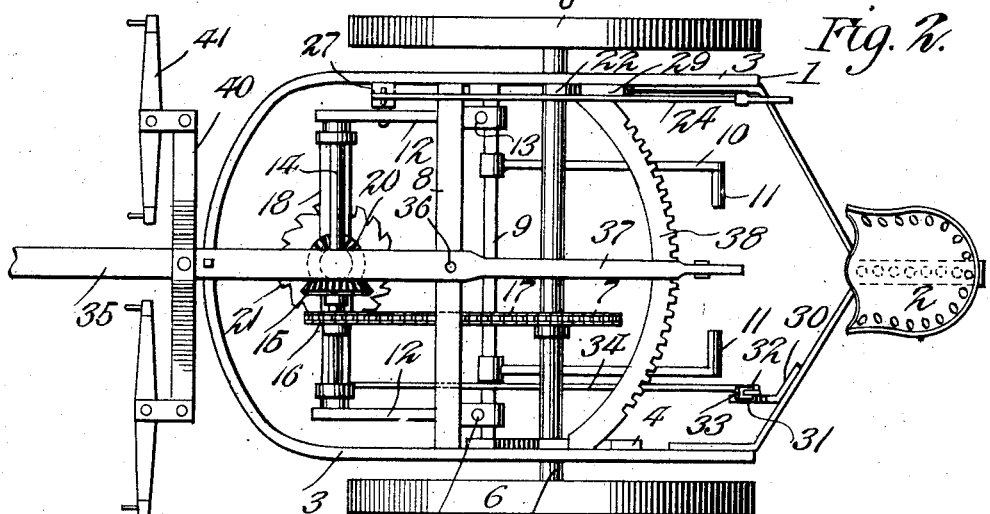
Fig. 3.
Witnesses
Geo. Ackman
J. W. Garner
Inventor
Duke N. Blackwell,
By Victor J. Evans
Attorney

UNITED STATES PATENT OFFICE.

DUKE N. BLACKWELL, OF SCOTTS HILL, TENNESSEE, ASSIGNOR OF ONE-HALF TO JAMES D. HELMS, OF SCOTTS HILL, TENNESSEE.

COTTON-CHOPPER.

No. 906,768.  Specification of Letters Patent.  Patented Dec. 15, 1908.

Application filed September 30, 1907. Serial No. 395,220.

*To all whom it may concern:*

Be it known that I, DUKE N. BLACKWELL, a citizen of the United States of America, residing at Scotts Hill, in the county of Henderson and State of Tennessee, have invented new and useful Improvements in Cotton-Choppers, of which the following is a specification.

This invention is an improved cotton chopper, in which a revoluble cotton chopping hoe is employed, which operates to destroy superfluous plants in cotton ridges or rows and reduce the same to "stands" at the required distance apart to enable them to be subsequently cultivated, and the said invention consists in the construction, combination and arrangement of devices hereinafter fully described and claimed.

In the accompanying drawings,—Figure 1 is a vertical longitudinal sectional view of a cotton chopping machine constructed in accordance with this invention. Fig. 2 is a top plan view of the same. Fig. 3 is a detail elevation showing a portion of the countershaft, the yoke which depends therefrom, the chopping hoe shaft and the gears which connect the chopping hoe shaft to the countershaft.

The frame 1 of the machine, which may be either of the form here shown or of any other suitable form and construction, is provided at its rear end with a seat 2 for the driver, and its side bars 3 are provided at points a suitable distance from the rear end of said frame with depending standards 4 which have bearings for the axle shaft 5. On the ends of the said axle shaft are driving and supporting wheels 6, one of which is in practice connected to the said axle shaft by means of pawl and ratchet mechanism of usual construction, and not here shown, to enable such wheel to revolve faster or slower than the other, as may be required, when turning a corner or at the end of a row. The said axle shaft is provided at a suitable point with a sprocket wheel 7. The sides 3 of the frame are connected together at a suitable distance from their front ends by an arch bar 8. A rock shaft 9, which is disposed transversely of the frame 1 at a suitable distance from the front end thereof, is journaled in bearings with which the standards 4 are provided. Rearwardly extending arms 10 are attached to the said rock shaft, have their rear ends downturned and are provided at such downturned rear ends with inwardly extending foot rests 11. A pair of rock arms 12 are attached to the said rock shaft at points near the ends thereof, as at 13, and are provided at their front ends with bearings for a counter-shaft 14. Said counter-shaft is provided, at a point near its center, with a beveled gear 15, and is further provided with a sprocket wheel 16, which sprocket wheel is connected to the sprocket wheel 7 by an endless sprocket chain 17. A yoke 18, which is substantially U-shaped, has the upper ends of its vertical arms pivotally mounted on the counter-shaft, and such yoke depends from such counter-shaft and is provided with a bearing for a vertical shaft 19, which is provided at its upper end with a beveled pinion 20 engaged by the beveled gear 15, and is provided at its lower end with a revoluble chopping hoe 21, which is of such construction as to enable it to be employed to cut out and destroy superfluous plants in the cotton rows or ridges.

At the right-hand side of the frame 1 is a standard 22 which is provided with a segment rack 23. A hand lever 24 is fulcrumed to the said standard, as at 25, and its front end is connected to one of the rock arms 12, by a vertical link rod 26 which passes through an opening in the horizontal upper arm of a bracket 27 which constitutes a stop and is attached to one side of the said frame. A coiled extensile spring 28 is placed on the said link rod with its lower end bearing on the said rock arm 12 and its upper end bearing under the horizontal upper arm of the said bracket. The function of the said spring is to press downwardly on the said rock arm so as to serve to keep the said rock arm and hence also the yoke and the chopping hoe 21 depressed and yet permit the rock arms 12, together with the counter-shaft, the yoke and the said revoluble hoe to yield upwardly. It will be understood that by means of the lever 24 the link rod 26 may be operated to raise or lower the revoluble chopping hoe, as may be required. The said lever, which may be readily operated by the driver, is provided with a locking dog 29 of usual construction which coacts with the said segment rack 23 to lock such lever, and hence also the hoe in any desired adjusted position. At the opposite side of the frame or that at which the lever 24 is mounted is a bracket 30 provided with a segment rack 31. A vertically disposed hand lever 32 is fulcrumed to the said bracket, is provided with a dog of usual construction, indicated at 33, to coact with such segment rack 31 to lock the said lever in any desired adjusted position, and the lower end of said lever is connected by a rod 34 to the yoke 18. Hence by moving the said lever 32, the said yoke may be turned angularly in a vertical plane to any desired extent to cause the shaft 19 of the revoluble cotton hoe to be disposed either in a vertical position or at any desired inclination.

The draft tongue 35 is fulcrumed on the center of the transversely disposed arch bar 8, as by means of a bolt 36, and said draft tongue is provided at its rear end with an arm 37 which forms a rear extension thereof and operates on a transversely disposed segment bar 38, with which the frame 1 is provided. The said arm 37 of the draft tongue is provided with a locking dog 39 which coacts with teeth of the segment bar 38 to lock the said draft tongue either in parallel position with reference to the wheel 6, or at any desired angle with respect thereto, and hence the said draft tongue may be employed to steer or direct the machine when the same is at work, in any desired direction. The draft tongue is provided with the usual doubletree 40 and swingletree 41. It is further provided with a frame 42 on its underside, in which is mounted a roller 43 that bears on the front end of the frame 1 and reduces friction between the tongue and the frame to enable the latter to be readily turned to any angle with reference to the tongue and the line of draft.

The operator, by means of the lever or arm 37 forming a rearward extension of the pivotally mounted tongue, causes the machine to move first in one direction and then in the other diagonally, to cause the revolving chopping hoe to cross the row of plants diagonally, so that the chopping hoe cuts out and destroys superfluous plants and leaves the "stands" at the required distance apart.

Having thus described the invention, what is claimed as new, is:—

1. The herein described cotton chopping machine comprising a frame having a supporting shaft and supporting wheels, said frame having a cross bar and also having a transversely extending rock bar, a draft tongue pivotally mounted on the cross bar of the frame and having means to engage and coact with the rock bar to lock said frame to said draft tongue in parallel or oblique relation, a rock shaft disposed transversely of said frame and provided with forwardly extending rock arms and rearwardly extending foot levers, a hand lever mounted on said frame and connected to one arm of said rock shaft to raise and lower said arm, a countershaft having its bearings in said rock arms, a yoke pivotally connected to and depending from said countershaft, a chopping hoe having its shaft mounted in said yoke, means to adjust said yoke to dispose the shaft of the chopping hoe in a vertical or inclined position as required, gears connecting said chopping hoe shaft and said countershaft and the supporting shaft of the frame to cause said countershaft to be driven from said supporting shaft.

2. A cotton chopping machine having a rock shaft provided with rock arms, a shaft having its bearings in such rock arms, a yoke pivotally connected to and depending from such shaft, a hoe shaft at right angles to the first mentioned shaft and having its bearings in said yoke, gears connecting such shafts, means to cause the first named shaft to revolve, and means to adjust the yoke to dispose the hoe shaft in adjusted position in a vertical plane.

In testimony whereof I affix my signature in presence of two witnesses.

DUKE N. BLACKWELL.

Witnesses:
   S. R. HUGHES,
   J. F. WHITE.